March 9, 1926.
H. E. OLSEN
PIPE CAP
Filed April 17, 1925
1,576,353
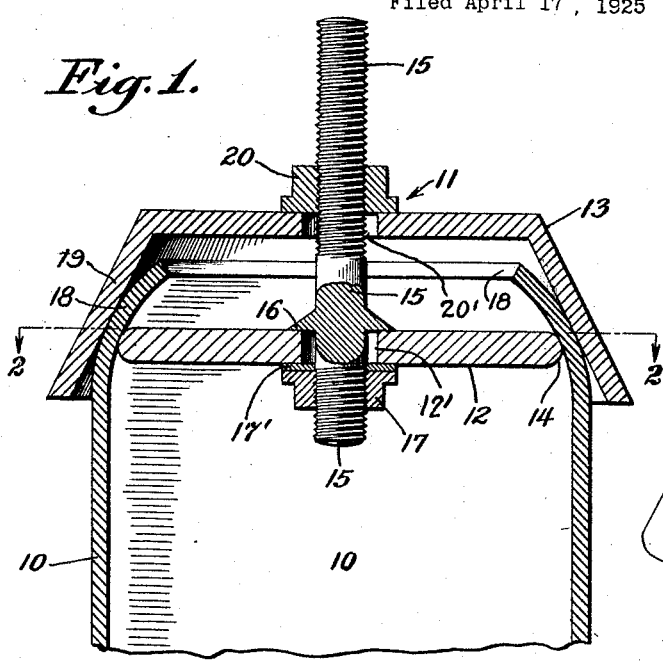
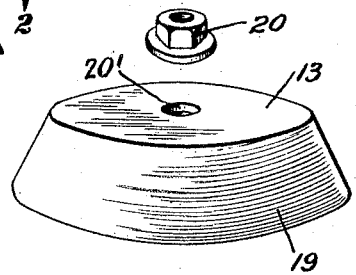
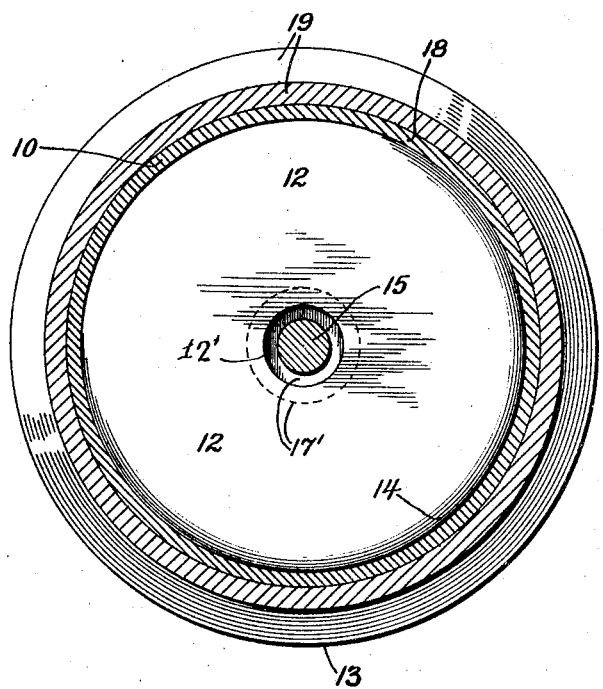
Harold E. Olsen
INVENTOR
BY Victor J. Evans
ATTORNEY Patented Mar. 9, 1926.

1,576,353

UNITED STATES PATENT OFFICE.

HAROLD E. OLSEN, OF BRONX, NEW YORK.

PIPE CAP.

Application filed April 17, 1925. Serial No. 23,997.

*To all whom it may concern:*

Be it known that I, HAROLD E. OLSEN, a citizen of the United States of America, residing at Bronx, in the county of Bronx and State of New York, have invented new and useful Improvements in Pipe Caps, of which the following is a specification.

This invention relates to improvements in pipe caps and has particular reference to a closure for sealing the end of the soil pipes of a plumbing system.

The principal object of the invention resides in a cap which may be quickly and easily applied to the end of a lead pipe for sealing the same, and which may be readily removed when it is desired to test the pipe system.

Another object is to provide an inexpensive means for sealing the end of a lead pipe, which includes a pair of co-acting parts for clamping the end walls of the pipe therebetween.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a vertical longitudinal sectional view of my improved cap in position upon the end of a lead pipe.

Figure 2 is a horizontal sectional view on the line 2—2 of Figure 1.

Figure 3 is a collective perspective view of the several parts of my invention.

Referring more particularly to the drawing, the reference numeral 10 designates the end of a soil pipe constructed of lead or other ductile material, and to which my improved sealing means which is shown in its entirety as at 11, is applied. My invention includes a pair of co-acting parts 12 and 13 between which the end walls of the pipe are adapted to be clamped. The part 12 is in the nature of an annular disk having its peripheral edge rounded as at 14 and provided with an opening 12' centrally thereof for freely receiving one end of a threaded stud 15. The stud is removably connected with the disk and is provided with an annular shoulder 16 against which the disk is held by means of a nut 17 and washer 17' which engages the threads on the lower end of the stud. When applying my invention to the end of a pipe, the part 12 is first inserted into the pipe with the stud extending beyond the end of the same. The diameter of the part 12 is less than the inner diameter of the pipe but the walls of the pipe are bent inwardly as at 18 on all sides to engage the rounded edge 14 of the disk. By reason of the flexibility of the pipe, it is possible to form an annular portion which adapts itself to the outer contour of the part 12.

The part 13 above referred to is in the nature of a cap and is formed with an apron or flared side wall 19. The top of the cap is provided with an opening 20' through which the threaded stud freely passes, and when in position, the apron or flared side wall engages the outer surface of the portion 18 of the pipe. In order to set-up a clamping action between the parts 12 and 13, there is provided a clamping nut 20 which co-acts with the threads on the outer end of the stud. By securing the nut tightly against the top of the part 13, it will be seen that the clamping action tends to draw the parts 12 and 13 toward each other, or into seating engagement with the reduced end of the pipe. Should any irregularities appear in the bent-end-walls 18 of the pipe during the bending operation, the same will be ironed out when the part 13 has been applied and a clamping action set-up between the parts. These parts are capable of sealing the pipe against leakage and may easily be removed when access is desired to the interior of the pipe for such purposes as testing the plumbing system.

The openings 12' and 20' are larger in diameter than the stud 15 so that the parts may have lateral movement with respect to each other during the clamping operation so as to adapt themselves to the contour of the walls of the pipe.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A closure comprising a disk, the periphery of which is adapted to engage the inner curved walls of the inwardly bent end of a ductile pipe, a cap having annular outwardly flared side walls adapted to engage the outer walls of the bent end and which co-acts with the disks for clamping the walls of the bent end therebetween, a threaded stud, said disk and cap having openings therein of a diameter greater than the diameter of the stud, and a clamping nut co-acting with the threads of said stud for engagement with said cap.

2. In combination with a ductile pipe having inwardly bent curved walls at one end thereof, a disk within said pipe and having its periphery in engagement with the inner curved walls of said pipe, a stud removably associated with said disk and extending beyond the curved walls of the pipe, a cap having an outwardly flared annular wall for wedging engagement with the exterior of the inwardly bent curved walls at a point adjacent the periphery of said disk, and a clamping nut associated with the thread on the outer end of said stud for maintaining said stud and disk in compressing relation.

In testimony whereof I have affixed my signature.

HAROLD E. OLSEN.